United States Patent
Ng et al.

(10) Patent No.: US 8,220,033 B2
(45) Date of Patent: Jul. 10, 2012

(54) METHOD AND APPARATUS FOR MANAGING BOOTSTRAP CREDENTIALS FOR CREDENTIALS-STORAGE SYSTEMS

(75) Inventors: Raymond K. Ng, San Jose, CA (US);
Ganesh Kirti, Santa Clara, CA (US);
Thomas Keefe, Mill Valley, CA (US);
Naresh Kumar, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1091 days.

(21) Appl. No.: 11/418,051

(22) Filed: May 3, 2006

(65) Prior Publication Data
US 2007/0261107 A1 Nov. 8, 2007

(51) Int. Cl.
*H04L 29/06* (2006.01)

(52) U.S. Cl. .......... 726/5; 726/6; 726/10; 713/167; 380/247

(58) Field of Classification Search ............ None
See application file for complete search history.

(56) References Cited

U.S. PATENT DOCUMENTS

| | | | |
|---|---|---|---|
| 2003/0145223 A1* | 7/2003 | Brickell et al. | 713/201 |
| 2004/0078294 A1* | 4/2004 | Rollins et al. | 705/27 |
| 2005/0182945 A1* | 8/2005 | Ali et al. | 713/182 |
| 2005/0289644 A1* | 12/2005 | Wray | 726/5 |
| 2006/0078119 A1* | 4/2006 | Jee et al. | 380/247 |
| 2006/0085845 A1* | 4/2006 | Davis et al. | 726/6 |
| 2006/0218396 A1* | 9/2006 | Laitinen et al. | 713/167 |

OTHER PUBLICATIONS

Crampton, "A Certificate-Free Security Infrastructure Supporting Password-Based User Authentication", 2007, CiteSeer.IST.*

* cited by examiner

*Primary Examiner* — Taghi Arani
*Assistant Examiner* — Gregory Lane
(74) *Attorney, Agent, or Firm* — Shun Yao; Park, Vaughan, Fleming & Dowler LLP

(57) ABSTRACT

One embodiment of the present invention provides a system that facilitates accessing a credential. During operation, the system receives a request at a credentials-storage framework (CSF) to retrieve the credential. If a target credential store containing the credential is not already connected to the CSF, the system looks up a bootstrap credential for the target credential store in a bootstrap credential store, which contains bootstrap credentials for other credential stores. Next, the system uses this bootstrap credential to connect the CSF to the target credential store. Finally, the system retrieves the credential from the target credential store, and returns the credential to the requestor.

21 Claims, 3 Drawing Sheets

METHOD AND APPARATUS FOR MANAGING BOOTSTRAP CREDENTIALS FOR CREDENTIALS-STORAGE SYSTEMS

BACKGROUND

1. Field of the Invention

The present invention relates generally to mechanisms for providing security within computer systems. More specifically, the present invention relates to a method and apparatus for managing bootstrap credentials for credentials-storage systems.

2. Related Art

Middle-tier applications running on top of application servers typically need to communicate with Enterprise Information System (EIS) tiers to access application-specific information related to end-users. To facilitate these communications, middle-tier applications typically store end-user credentials in back-end systems, such as RDBMS/LDAP servers.

However, this type of solution is incomplete because bootstrap credentials for credentials-storage systems still need to be managed. One common way to resolve this problem is to prompt the administrator for the credentials-storage system to obtain bootstrap credentials during system startup. However, in cases where the administrator is not present, for example in cron jobs or in restart scenarios, this is not a viable option. Another common way to resolve this problem is to store the bootstrap credentials in a local configuration file of the credentials-storage system. For example, a bootstrap credential can be stored in an XML file that contains the host:port and username/password of the backend system. However, this solution begs the question of how to secure these all-important bootstrap credentials when they are stored in such local files.

Hence, what is needed is a method and apparatus that facilitates securely storing bootstrap credentials for a credentials-storage system without the above-described problems.

SUMMARY

One embodiment of the present invention provides a system that facilitates accessing a credential. During operation, the system receives a request at a credentials-storage framework (CSF) to retrieve the credential. If a target credential store containing the credential is not already connected to the CSF, the system looks up a bootstrap credential for the target credential store in a bootstrap credential store, which contains bootstrap credentials for other credential stores. Next, the system uses this bootstrap credential to connect the CSF to the target credential store. Finally, the system retrieves the credential from the target credential store, and returns the credential to the requestor.

In a variation of this embodiment, the system performs authorization checks to verify that the requestor is authorized to receive the credential prior to retrieving the credential for the requester.

In a variation of this embodiment, looking up the bootstrap credential in the bootstrap credential store involves first asserting a privileged mode, and then while in privileged mode, looking up the bootstrap credential in the bootstrap credential store.

In a variation on this embodiment, during the lookup process, the bootstrap credential store receives a request to perform the lookup. In response to this request, the bootstrap credential store determines whether the request is being made while the CSF is operating in privileged mode, and also checks a policy to determine whether the code that is making the request is authorized to make the request. If the CSF is operating in privileged mode and the request is consistent the policy, the bootstrap credential store retrieves the bootstrap credential, and returns the retrieved bootstrap credential to the CSF.

In a further variation, while determining whether the code that is making the request is authorized to make the request, the system asks a class loader to examine a signature on the code.

In a further variation, upon receiving the request, the system identifies the target credential store by looking up a configured credential provider for the requestor.

In a further variation, communications between the CSF and the target credential store take place through a standardized service provider interface (SPI), which can be used to communicate with many different types of credential stores.

In a further variation, the bootstrap credential store is implemented as an encrypted wallet.

In a variation of this embodiment, the credential can include: a user-name and password, a token, or a digital certificate.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, and CDs (compact discs) and DVDs (digital versatile discs or digital video discs.

Overview

One embodiment of the present invention provides a credentials-storage framework (CSF) which accesses a "bootstrap credential store" to obtain bootstrap credentials for other credential stores. Instead of storing the bootstrap credential for a given credential store in a configuration file or prompting the user every time the application server starts up, the system stores the bootstrap credentials in a "bootstrap credential store," which can be implemented as an encrypted wallet. Note that the system manages correlations between credential stores and associated bootstrap credentials internally within CSF, thereby eliminating the need to store the bootstrap credentials (and related metadata) in a configuration file.

An advantage of this solution over the other common alternatives, such as prompting an administrator or storing bootstrap credentials in a configuration file, is that the solution provides more security. Another advantage of this solution is that it avoids the need for an administrator to always be present to facilitate secure failure-restarts for the system.

One disadvantage of this solution is that some amount of overhead is involved in creating/managing a bootstrap credential store to serve other credential stores. However, this disadvantage is mitigated by the fact that the number of bootstrap credentials should be relatively small.

Hence, one embodiment of the present invention provides a mechanism for managing bootstrap credentials for credential stores in a reasonably secure and efficient manner without sacrificing usability or functionality. This in turn facilitates building secure, highly-available and feature-rich middle-tier apps such as "portals" and "business intelligence applications." One embodiment of the present invention is described in more detail below.

Multi-Tier Architecture

Figure 1:
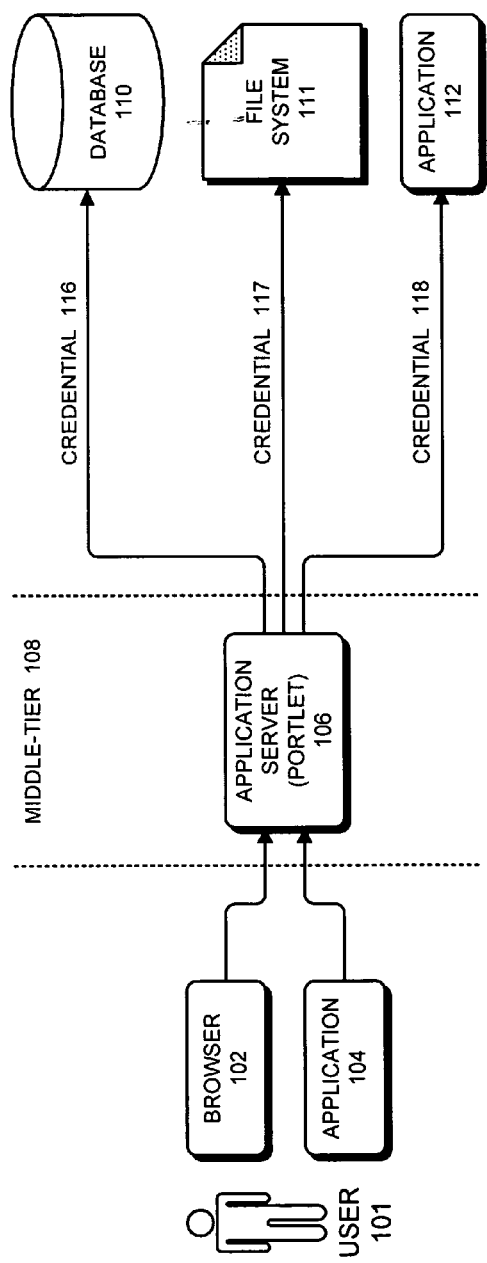
FIG. 1 illustrates a multi-tier architecture in accordance with an embodiment of the present invention.

FIG. 1 illustrates a multi-tier architecture in accordance with an embodiment of the present invention. This multi-tier architecture includes a client tier 107, a middle tier 108 and an EIS tier 109. Entities within client tier 107, such as a browser 102 or an application 104 accesses an application 106 (e.g., a portlet) which resides in middle tier 108. Application 106 in turn accesses entities within EIS tier 109, such as a database 110, a file system 111 or another application 112, to obtain application-specific information, for example relating to the end-user of an application.

Application 106 typically needs to present credentials to obtain access information contained within entities in EIS tier 109. For example, as is illustrated in FIG. 1, application 106 uses credentials 116, 117 and 118 to access database 110, file system 111 and application 112, respectively. These credentials can generally include any type of credential, such as: a user-name and password, a token or a digital certificate. Furthermore, the credentials can be associated with different entities, such as an end-user or an application.

Credentials-Storage Framework

Figure 2:
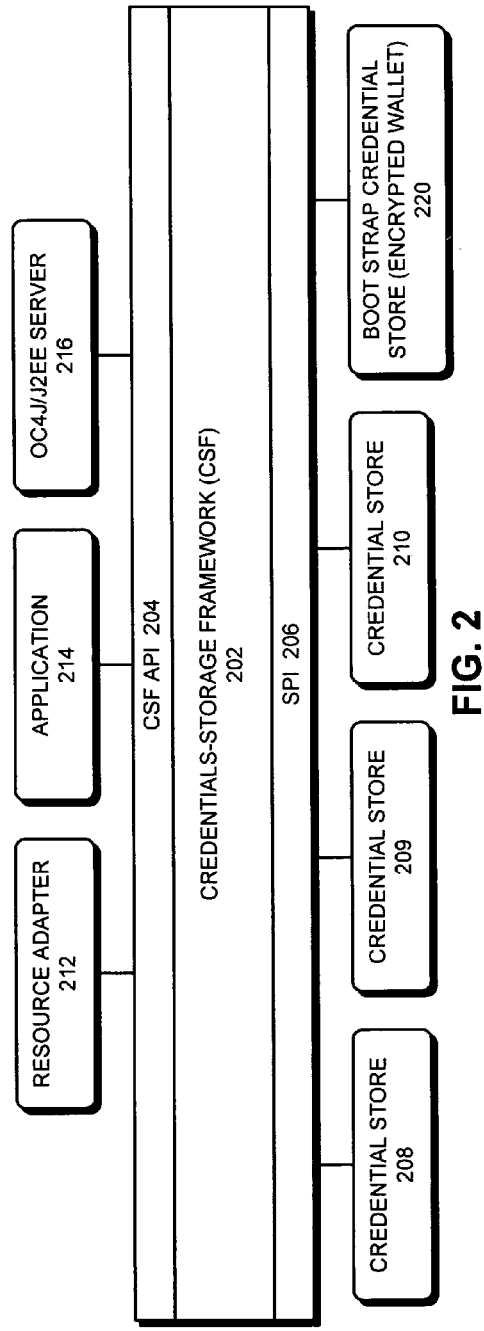
FIG. 2 illustrates a credentials-storage framework in accordance with an embodiment of the present invention.
Figure 3:
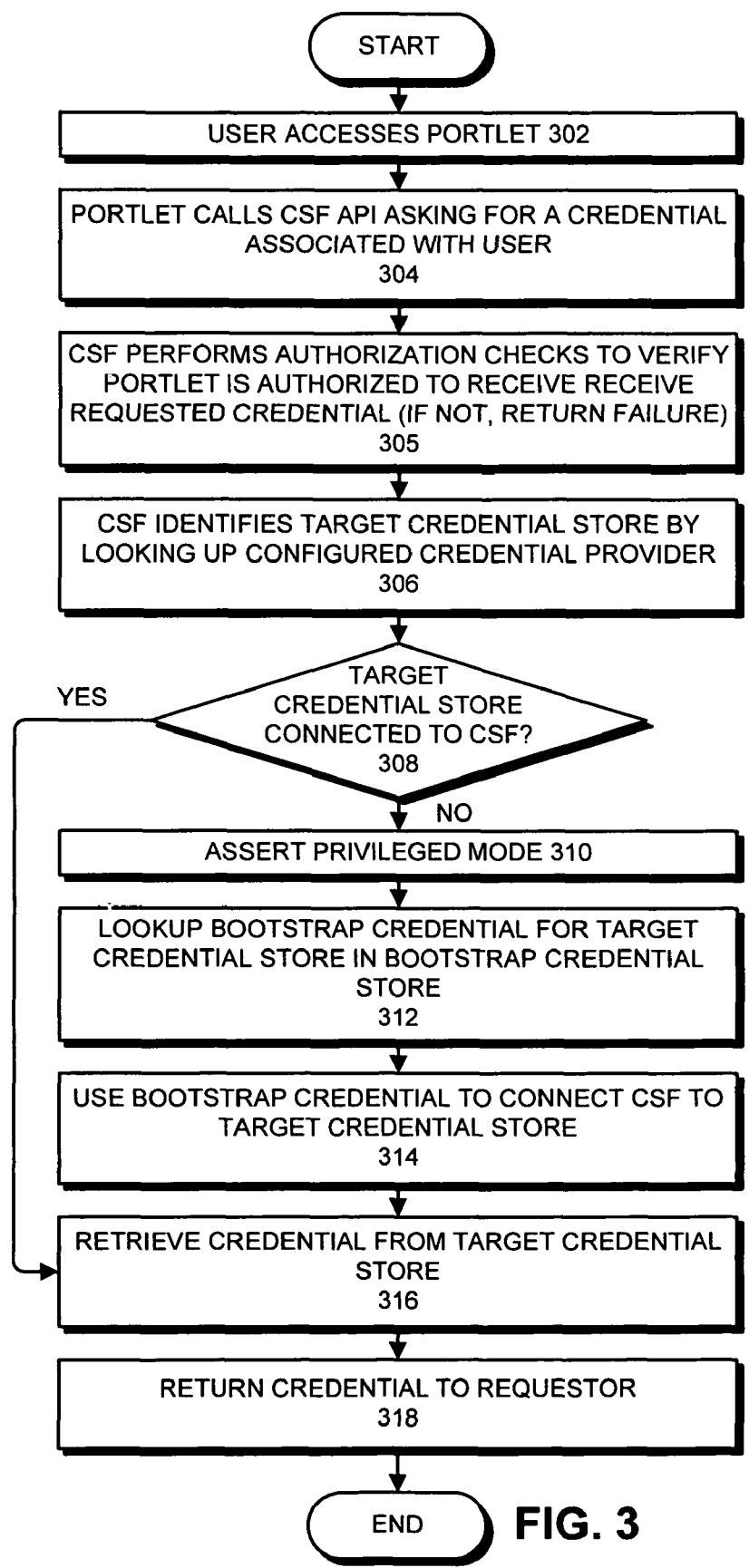
FIG. 3 presents a flow chart illustrating the process of accessing a credential in accordance with an embodiment of the present invention.

FIG. 2 illustrates a credentials-storage framework (CSF) in accordance with an embodiment of the present invention. Referring to FIG. 3, the CSF API 204 defines an abstraction layer that decouples the application components from the underlying credential store implementation(s). For instance, an application written against CSF API 204 should work equally well when the underlying credential store is based on a secret store or an LDAP store. (Note that the acronym "LDAP" refers to the "lightweight directory access protocol.")

Hence, one embodiment of the present invention allows an application to be developed against a lightweight credential-store mechanism and then deployed to a production (test) environment where a directory-based credential-store mechanism is deployed.

To enable this type of "pluggability," a standard provider interface, such as a "service provider interface" (SPI) 206, is provided to facilitate plugging in third-party credential store implementations.

Referring to FIG. 2, a number of entities, such as a resource adapter 212, and application 214 or an OC4J/J2EE server 216, interact with CSF API 204. At the same time, a number of different types of credential stores 208, 209 and 210 interact with SPI 206. In additional to credential stores 208-210, a bootstrap credential store 220 also interacts with SPI 206. Note that bootstrap credential store 220 can be implemented as an encrypted wallet.

Accessing a Credential

FIG. 3 presents a flow chart illustrating an exemplary process for accessing a credential in accordance with an embodiment of the present invention. In this example, a user first accesses a portlet (step 302). Next, the portlet calls the CSF API asking for a credential associated with the user (step 304). (For example, this can involve invoking a method called "CSF.getcredentials.")

In response to the request, the CSF performs authorization checks to verify that the calling application (in this case the portlet) is authorized to receive the requested credential (step 309). While making these authorization checks, the CSF can consult a security subsystem to see if the calling application (the portlet) is authorized to make the call. For example, these authorization checks can involve consulting a security policy, a classloader and a public key infrastructure (PKI).

These authorization checks can based on a "caller identity," which is the identity of the authenticated principal (end user) that originally made the request, say via a browser to the portlet. (Note that the calling application (the portlet) must first authenticate the user prior to calling the CSF, unless the calling application is a "system" application that does not operate within a caller context.) The authorization checks performed by the CSF can also be based on the "caller code," which is the code (portlet) that is making the CSF.getCredentials call.

If the CSF determines that the either the caller identity or the caller code is not trusted, the CSF returns a failure to the calling application.

On the other hand, if the CSF ascertains that both the caller identity and the caller code are trusted, the CSF proceeds to invoke the underlying credential store implementation. In doing so, the CSF first identifies a "target credential store" by looking up a configured credential provider for the user or application (step 306).

Next, the system determines whether the target credential store is already connected to the CSF (step 308). If so, the CSF retrieves the desired credential from the target credential store (step 316).

If not, the CSF asserts privileged mode (step 310) and looks up a bootstrap credential for the target credential store in the bootstrap credential store (step 312). Next, the CSF uses the bootstrap credential to connect the CSF to the target credential store (step 314), and retrieves the desired credential from the target credential store (step 316).

Finally, the system returns the desired credential to the requester, which in this case is the portlet (step 318). The portlet can then use this credential to access application-specific information (for example, information related to the user) from the credential store.

Accessing a Bootstrap Credential Store

Figure 4:
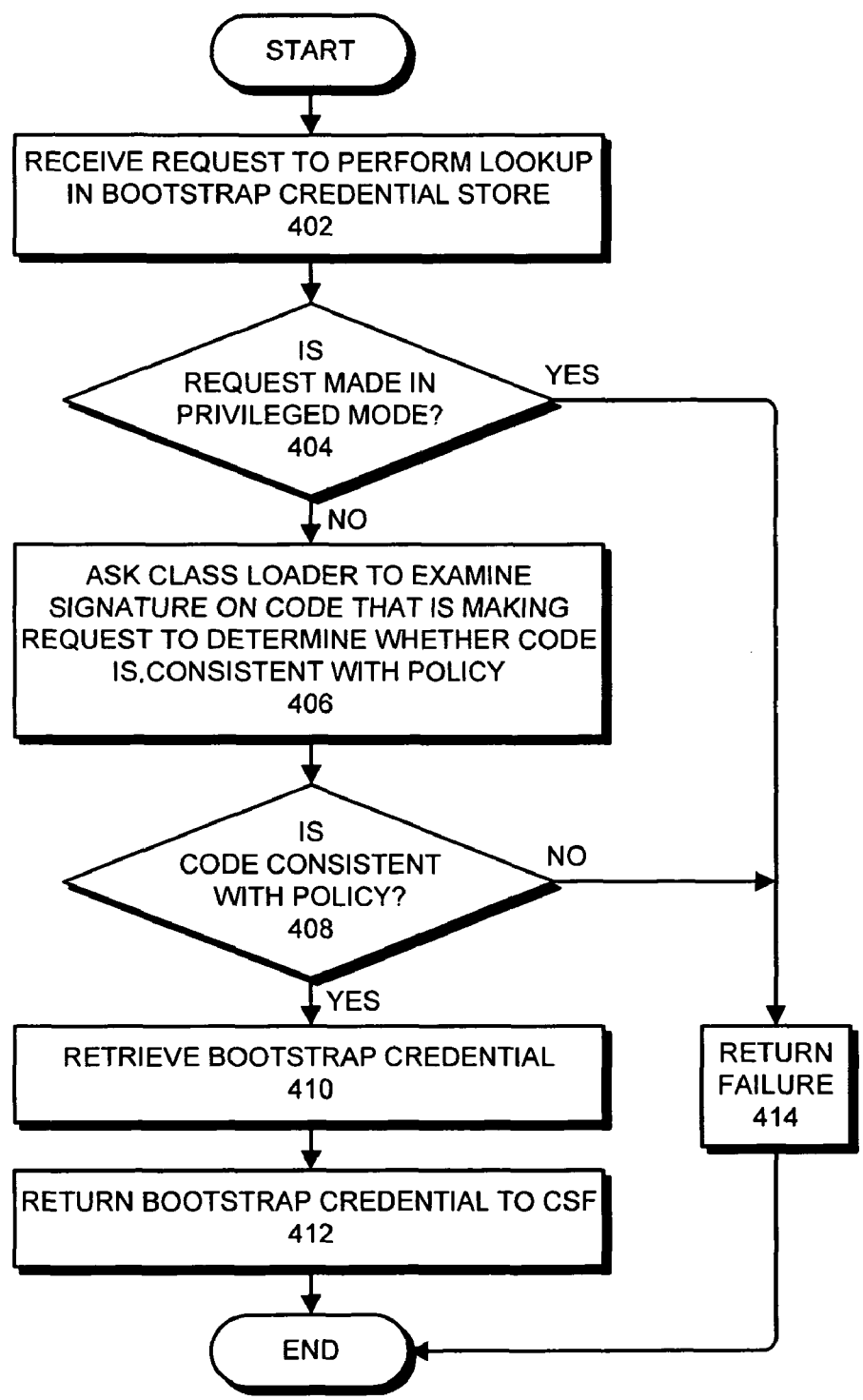
FIG. 4 presents a flow chart illustrating the process of accessing the bootstrap credential store in accordance with an embodiment of the present invention.

FIG. 4 presents a flow chart illustrating the process of accessing the bootstrap credential store in accordance with an embodiment of the present invention. This flow chart illustrates what occurs during step 312 in the flow chart in FIG. 3.

First, the bootstrap credential store receives a request to perform a lookup (step 402). Upon receiving the request, the bootstrap credential store first determines if the request is made in privileged mode (step 404). If not, the system returns a failure (step 414).

Otherwise, if the request was made in privileged mode, the system asks a class loader to examine a signature on the code (which in this case is the code for the CSF) to determine whether the use of the code is consistent with a configured policy for the bootstrap credential store (steps 406 and 408). If not, the system returns a failure (step 414).

Otherwise, if the code is consistent with the policy, the bootstrap credential store retrieves the requested bootstrap credential (step 410), and then returns the bootstrap credential to the requester, which is this case is the CSF (step 412).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for retrieving a user credential, comprising:
   receiving, from a requestor, a request at a computer to retrieve the user credential via an application programming interface (API);
   identifying a target credential store that stores the user credential;
   determining whether the requestor has access to the target credential store;
   in response to the requestor not having access to the target credential store, determining whether API is operating in a privileged mode and whether the requestor is authorized to perform a lookup in the bootstrap credential store, wherein the API is in communication with the target credential store and bootstrap credential store via a service provider interface;
   in response to the API operating in the privileged mode and the requestor being authorized to access the bootstrap credential store, performing a lookup in the bootstrap credential store and retrieving the bootstrap credential; and
   retrieving the user credential from the target credential store using the obtained bootstrap credential.

2. The method of claim 1, wherein the method further comprises performing authorization checks to verify that the requestor is authorized to receive the user credential prior to retrieving the user credential for the requestor.

3. The method of claim 1, wherein obtaining the bootstrap credential involves:
   asserting the privileged mode; and
   while in the privileged mode, obtaining the bootstrap credential from the bootstrap credential store.

4. The method of claim 1, wherein determining whether requestor is authorized to make the request involves asking a class loader to examine a signature on the requestor to determine whether the requestor is consistent with the policy.

5. The method of claim 1, wherein upon receiving the request, the method further comprises identifying the target credential store by looking up a configured credential provider for the requestor.

6. The method of claim 1, wherein the bootstrap credential store is implemented as an encrypted wallet.

7. The method of claim 1, wherein the user credential comprises one or more of:
   a user-name and password;
   a token; and
   a digital certificate.

8. A non-transitory computer-readable storage medium storing instructions that when executed by a computer cause the computer to perform a method for retrieving a user credential, the method comprising:
   receiving, from a requestor, a request at a computer to retrieve the user credential via an application programming interface (API);
   identifying a target credential store that stores the user credential;
   determining whether the requestor has access to the target credential store;
   in response to the requestor not having access to the target credential store, determining whether API is operating in a privileged mode and whether the requestor is authorized to perform a lookup in the bootstrap credential store, wherein the API is in communication with the target credential store and bootstrap credential store via a service provider interface;
   in response to the API operating in the privileged mode and the requestor being authorized to access the bootstrap credential store, performing a lookup in the bootstrap credential store and retrieving the bootstrap credential; and
   retrieving the user credential from the target credential store using the obtained bootstrap credential.

9. The computer-readable storage medium of claim 8, wherein the method further comprises performing authorization checks to verify that the requestor is authorized to receive the user credential prior to retrieving the user credential for the requestor.

10. The computer-readable storage medium of claim 8, wherein obtaining the bootstrap credential involves:
    asserting the privileged mode; and
    while in the privileged mode, obtaining the bootstrap credential from the bootstrap credential store.

11. The computer-readable storage medium of claim 8, wherein determining whether the requestor is authorized to make the request involves asking a class loader to examine a signature on the requestor to determine whether the requestor is consistent with the policy.

12. The computer-readable storage medium of claim 8, wherein upon receiving the request, the method further comprises identifying the target credential store by looking up a configured credential provider for the requestor.

13. The computer-readable storage medium of claim 8, wherein the bootstrap credential store is implemented as an encrypted wallet.

14. The computer-readable storage medium of claim 8, wherein the user credential comprises one or more of:
    a user-name and password;
    a token; and
    a digital certificate.

15. An apparatus that retrieves a user credential, comprising:
    a processor;
    a memory;
    a receiving mechanism configured to receive, from a requestor, a request to retrieve the user credential via an application programming interface (API);
    an identifying mechanism configured to identify a target credential store that stores the user credential;
    a determination mechanism configured to determine whether the requestor has access to the target credential store;
    a bootstrap credential obtaining mechanism configured to:
        in response to the requestor not having access to the target credential store, determine whether API is operating in a privileged mode and whether the requestor is authorized to perform a lookup in the bootstrap credential store, wherein the API is in communication with the target credential store and bootstrap credential store via a service provider interface, and in response to the API operating in the privileged mode and the requestor being authorized to access the bootstrap credential store, to perform a lookup in the bootstrap credential store and retrieving the bootstrap credential; and; obtain a bootstrap credential associated with the target credential store from a bootstrap credential store, wherein the bootstrap credential store and the target credential store are both coupled to the API via a standardized service provider interface (SPI), thereby allowing the API to communicate with different types of credential stores; and retrieval mechanism configured to retrieve the user credential from the target credential store using the obtained bootstrap credential obtained.

16. The apparatus of claim 15, further comprising an authorization mechanism configured to verify that the requestor is authorized to receive the user credential.

17. The apparatus of claim 15, wherein while obtaining the bootstrap credential, the bootstrap credential obtaining mechanism is configured to:

assert the privileged mode; and while in the privileged mode, obtain the bootstrap credential from the bootstrap credential store.

18. The apparatus of claim 15, wherein while determining whether the requestor is authorized to make the request, the bootstrap credential store is configured to ask a class loader to examine a signature on the requestor to determine whether the requestor is consistent with the policy.

19. The apparatus of claim 15, wherein upon receiving the request, the receiving mechanism is configured to identify the target credential store by looking up a configured credential provider for the requestor.

20. The apparatus of claim 15, wherein the bootstrap credential store is implemented as an encrypted wallet.

21. The apparatus of claim 15, wherein the user credential comprises one or more of:

a user-name and password;

a token; and a digital certificate.

* * * * *

UNITED STATES PATENT AND TRADEMARK OFFICE
CERTIFICATE OF CORRECTION

PATENT NO.       : 8,220,033 B2  
APPLICATION NO.  : 11/418051  
DATED            : July 10, 2012  
INVENTOR(S)      : Ng et al.

Page 1 of 1

It is certified that error appears in the above-identified patent and that said Letters Patent is hereby corrected as shown below:

In column 1, line 57, delete "requester." and insert -- requestor. --, therefor.

In column 4, line 50, delete "requester," and insert -- requestor, --, therefor.

In column 5, line 6, delete "requester," and insert -- requestor, --, therefor.

In column 7, line 13, in Claim 15, delete "retrieval" and insert -- a retrieval --, therefor.

In column 7, line 15, in Claim 15, delete "credential obtained." and insert -- credential. --, therefor.

Signed and Sealed this
Second Day of October, 2012

David J. Kappos
*Director of the United States Patent and Trademark Office*